United States Patent [19]
Hori

[11] Patent Number: 5,906,073
[45] Date of Patent: May 25, 1999

[54] AUTOMOTIVE DOOR STRUCTURE

[75] Inventor: Kazunobu Hori, Hamamatsu, Japan

[73] Assignee: Suzuki Motor Corporation, Hamamatsu, Japan

[21] Appl. No.: 09/016,881

[22] Filed: Jan. 30, 1998

[30] Foreign Application Priority Data

Jan. 31, 1997 [JP] Japan .................................. 9-018451

[51] Int. Cl.⁶ .................................................. E06G 3/00
[52] U.S. Cl. ............................................... 49/503; 49/394
[58] Field of Search .......................... 49/501, 502, 503, 49/394; 296/146.5, 146.6

[56] References Cited

U.S. PATENT DOCUMENTS

| | | | |
|---|---|---|---|
| 4,794,735 | 1/1989 | Batchelder et al. | 49/503 |
| 4,862,641 | 9/1989 | McCarty | 49/394 |
| 5,307,129 | 4/1994 | Hlavaty | 49/394 |
| 5,617,676 | 4/1997 | Kleefeldt et al. | 49/502 |

*Primary Examiner*—Daniel P. Stodola
*Assistant Examiner*—Curtis A. Cohen
*Attorney, Agent, or Firm*—Alston & Bird LLP

[57] ABSTRACT

Bent portions (28a and 28b) substantially perpendicular to the base plane of a door inner panel (4) are formed by bending at a door inner panel portion near a portion where a door opener handle is disposed, attaching portions (16a and 16b) facing the bent portions (28a and 28b) of the door inner panel (4) are provided in a reinforcement member (12) interposed between the door inner panel (4) and a door outer panel (5) to reinforce the portion where the door opener handle is disposed, and the attaching portions (16a and 16b) of the reinforcement member (12) and the bent portions (28a and 28b) of the door inner panel (4) are joined together in a state in which they are in slidable contact with each other.

4 Claims, 6 Drawing Sheets

AUTOMOTIVE DOOR STRUCTURE

FIELD OF THE INVENTION

The present invention relates to an automotive door structure and, more particularly, to a door structure which can suitably be applied to a reinforcement structure for an automotive back door opener handle attaching portion and the like.

BACKGROUND OF THE INVENTION

Figure 7:
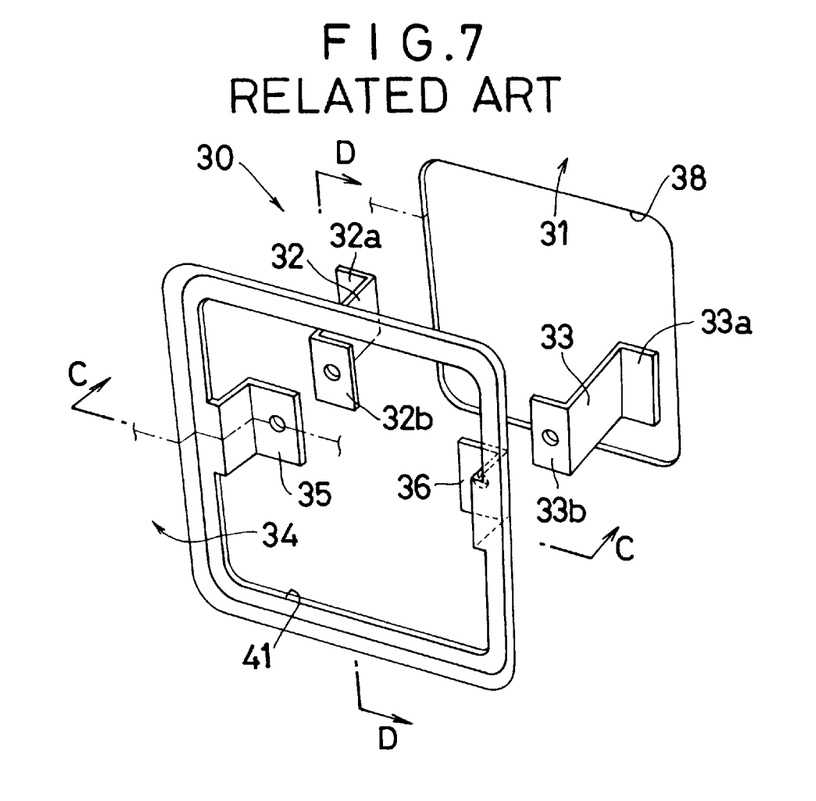
FIG. 7 is an exploded perspective view showing a conventional door structure.
Figure 8:
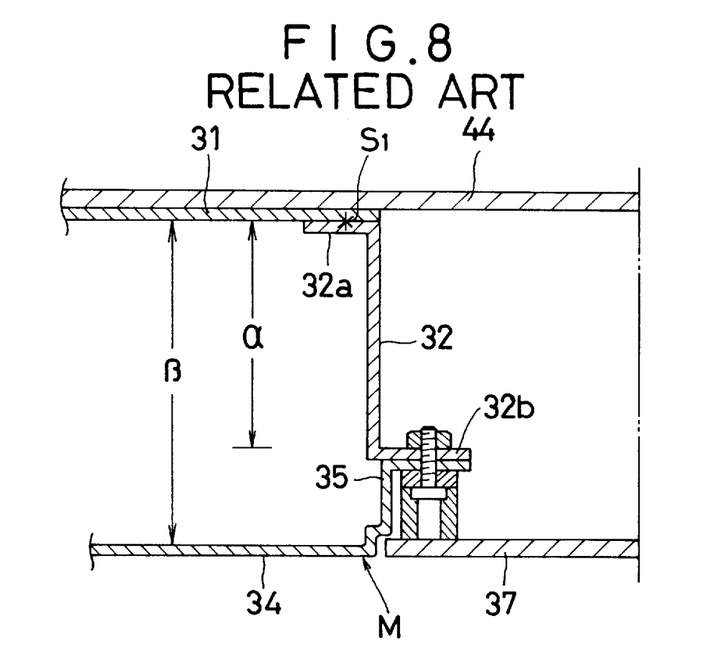
FIG. 8 is a sectional view taken along the line C—C of FIG. 7.

Conventionally, the reinforcement of an automotive back door opener handle attaching portion is provided, for example, by such a structure as shown in FIGS. 7 and 8. Specifically, bent portions 32a and 33a of a pair of crank-shaped reinforcement members 32 and 33 are fitted to a door inner panel 31 constituting the inside surface of a back door 30 by spot welds $S_1$ as shown in FIG. 8, and a pair of attaching portions 35 and 36 of a door outer panel 34, which are bent in an L shape toward the door inner panel 31, are put on bent portions 32b and 33b on the other side of the paired reinforcement members 32 and 33, by which these elements are fastened by bolting together with a handle case 37. In this case, the spot welds $S_1$ of the reinforcement members 32 and 33 to the door inner panel 31 are made on the base plane of the door inner panel 31 (door inner panel base plane), and the fastening of the door outer panel 34 to the reinforcement members 32 and 33 is done on a plane, substantially parallel to the base plane of the door inner panel 31, at a distance α apart from the base plane of the door inner panel 31.

Figure 10:
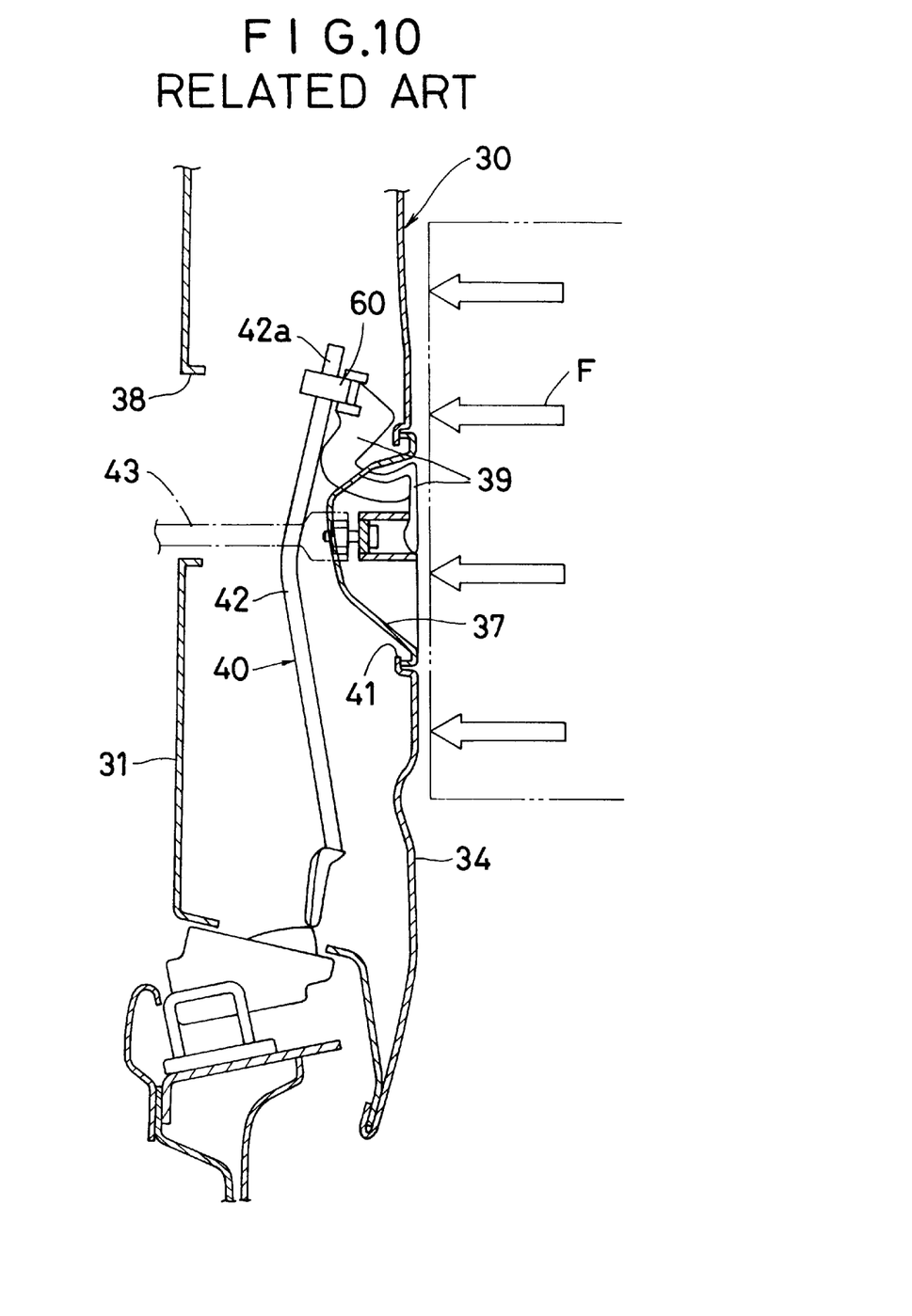
FIG. 10 is a sectional view taken along the line D—D of FIG. 7.

In FIG. 7, reference numeral 38 denotes a work opening formed in the door inner panel 31 to perform the work for connecting a back door opener handle 39 to an interlocking mechanism 40 (see FIG. 10), and 41 denotes a handle operating opening formed in the door outer panel 34 to operate the back door opener handle 39. The work opening 38 is a service hole having an opening area necessary for a box spanner 43 to be inserted, as shown in FIG. 10, during the work for connecting the back door opener handle 39 to an upper end 42a of an operating rod 42 (see FIG. 10) operated in connection with the turning operation of the back door opener handle 39 and when the door outer panel 34 is bolted to the reinforcement members 32 and 33 together with the handle case 37. In FIG. 8, reference numeral 44 denotes a door inner trim attached to the cabin-side surface of the door inner panel 31.

Figure 9:
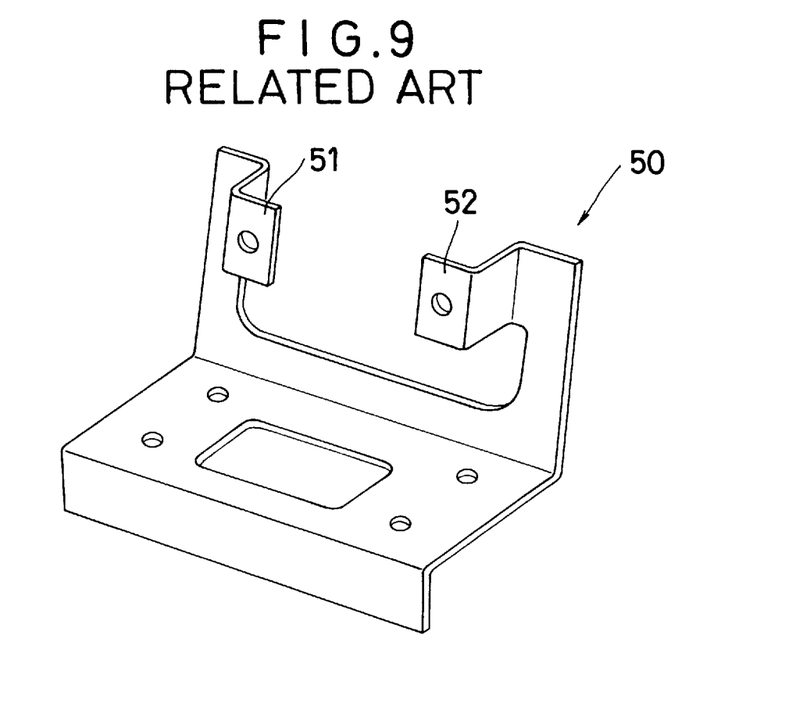
FIG. 9 is a perspective view of a reinforcement member used for a conventional door structure.

A latch reinforcing reinforcement member 50 as shown in FIG. 9 is sometimes used as another conventional reinforcement structure. In this case, the upper part of the latch reinforcing reinforcement member 50 is extended upward to provide a pair of attaching portions 51 and 52, and the attaching portions 35 and 36 of the door outer panel 34 (see FIG. 7) are bolted to the attaching portions 51 and 52 of the reinforcement member 50 assembled to the door inner panel 31.

However, the above-described conventional door structure has the following problems in either case. First, if variations exist in a distance β between the door inner panel 31 and the door outer panel 34 at the back door opener handle attaching portion, that is, in a distance β (see FIG. 8) between a door opener handle tightening plane of the door outer panel 34 and the door inner panel 31, in assembling the reinforcement member 32, 33 or 50 which has been assembled in advance to the door inner panel 31 to the door outer panel 34, the bolts are tightened in a state in which these elements interfere with each other or a gap exists between these elements. Therefore, there is a possibility of deformation, which mars the appearance, occurring at the corner of the door outer panel 34, that is, at a place indicated by arrow M in FIG. 8.

Also, the turning operation force for the back door opener handle 39 disposed to the door outer panel 34 acts in the direction such that the spot weld $S_1$ portions which connect the reinforcement members 32 and 33 to the door inner panel 31 are separated, so that this construction is disadvantageous in terms of connection strength.

Further, because the back door opener handle 39 is connected to the upper end 42a of the operating rod 42 constituting the interlocking mechanism 40 of the back door opener handle 39 on the door inner panel 31, and because only the work opening 38 with a small opening area, which is necessary for assembling parts, is formed, if an excessive external force (impact force) is applied to the door outer panel 34 of the back door 30 from the rear side as indicated by arrows F in FIG. 10, the upper end 42a, a connecting portion 60 connecting with the back door opener handle 39, and the like of the operating rod 42 interfere with the door inner panel 31 due to the deformation of the door outer panel 34, so that there is a possibility that the back door is opened unexpectedly.

Also, because the distance α from the base plane of the door inner panel 31 to the attachment plane of the door outer panel 34 (the fastening plane between the reinforcement member 32, 33 or 50 and the door outer panel 34) is long as shown in FIG. 8, the accuracy of the reinforcement member attaching plane of the door inner panel 31 easily affects the attaching position of the reinforcement member 32, 33 or 50, so that the position of the handle operating opening 41 with respect to the back door opener handle 39 is not stabilized. Further, the door inner panel 31 has low strength. Also, the reinforcement member 32, 33 or 50 itself is large in shape because the distance α is long, so that this structure is disadvantageous in terms of cost and weight.

SUMMARY OF THE INVENTION

The present invention was made to solve the above problems.

A first object of the present invention is to provide an automotive door structure which can absorb the variations in the distance from a door opener handle tightening plane of a door outer panel to a door inner panel, can prevent the deformation of the door outer panel and the floating of the door opener handle, and is advantageous in terms of the strength of a door opener handle attaching portion.

A second object of the present invention is to provide an automotive door structure in which a trouble such that the door is opened unexpectedly can be prevented even if an excessive external force is applied.

A third object of the present invention is to provide an automotive door structure in which the luggage in the cabin is prevented from being damaged by an reinforcement member even if the door outer panel is deformed by an excessive impact force applied from the outside and the reinforcement member is moved toward the door inner panel, tip end edges of the reinforcement member can be used as a guide in assembling the door outer panel to the door inner panel, and the strength of attaching portions of the reinforcement member can be increased.

A fourth object of the present invention is to provide an automotive door structure in which the strength of the door inner panel and the positional accuracy of the door opener handle can be increased, and in turn the size and weight of the reinforcement member can be decreased, resulting in a decrease in cost of the reinforcement member.

To achieve the above first object, the present invention provides an automotive door structure, in which bent portions substantially perpendicular to the base plane of a door inner panel are formed by bending at a door inner panel portion near a portion where a door opener handle is disposed, attaching portions facing the bent portions of the door inner panel are provided in a reinforcement member interposed between the door inner panel and a door outer panel to reinforce the portion where the door opener handle is disposed, and the attaching portions of the reinforcement member and the bent portions of the door inner panel are joined together in a state in which they are in contact with each other.

To achieve the above second object, according to the present invention, the upper end of a work opening formed in the door inner panel so as to correspond to the door opener handle and an interlocking mechanism therefor and the upper portion the reinforcement member corresponding to the door opener handle and the interlocking mechanism therefor are arranged above the door opener handle and the upper end of an operating rod of the interlocking mechanism.

To achieve the above third object, according to the present invention, tip end edges on the cabin side of the attaching portions of the reinforcement member are bent so as to intersect diagonally with the base plane of a door inner trim disposed on the inside surface of an automotive door.

To achieve the above fourth object, according to the present invention, a drawn portion such that the door inner panel approaches the door outer panel is formed in the door inner panel at a position near the connecting portions of the attaching portions of the reinforcement member and the bent portions of the door inner panel.

BRIEF DESCRIPTION OF THE DRAWINGS

The present invention will now be described more fully in detail with reference to the accompanying drawings, in which preferred embodiments of the invention are shown. This invention should not, however, be construed as limited to the embodiments set forth herein; rather, they are provided so that this disclosure will be thorough and complete and will convey the scope of the invention to those skilled in the art.

DETAILED DESCRIPTION OF PREFERRED EMBODIMENTS

One embodiment of the present invention will be described with reference to FIGS. 1 to 6.

Figure 1:
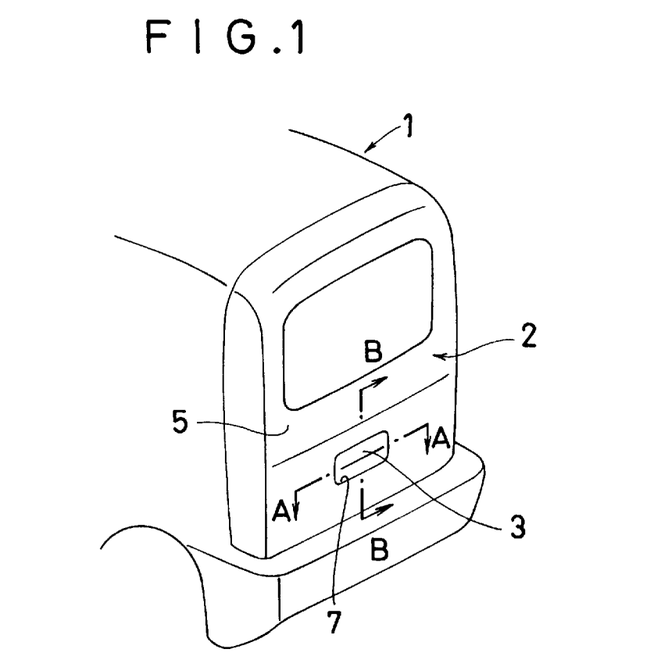
FIG. 1 is a perspective view of a vehicle body rear portion of a four-wheeled automobile having a door structure in accordance with the present invention.

FIG. 1 shows a vehicle body rear portion of a four-wheeled automobile 1 having a door structure in accordance with the present invention. In FIG. 1, reference numeral 2 denotes a jump up type (turning type) back door disposed at the rear part of the four-wheeled automobile 1, and 3 denotes a back door opener handle used for unlocking the back door 2 and turning it to the open position.

Figure 5:
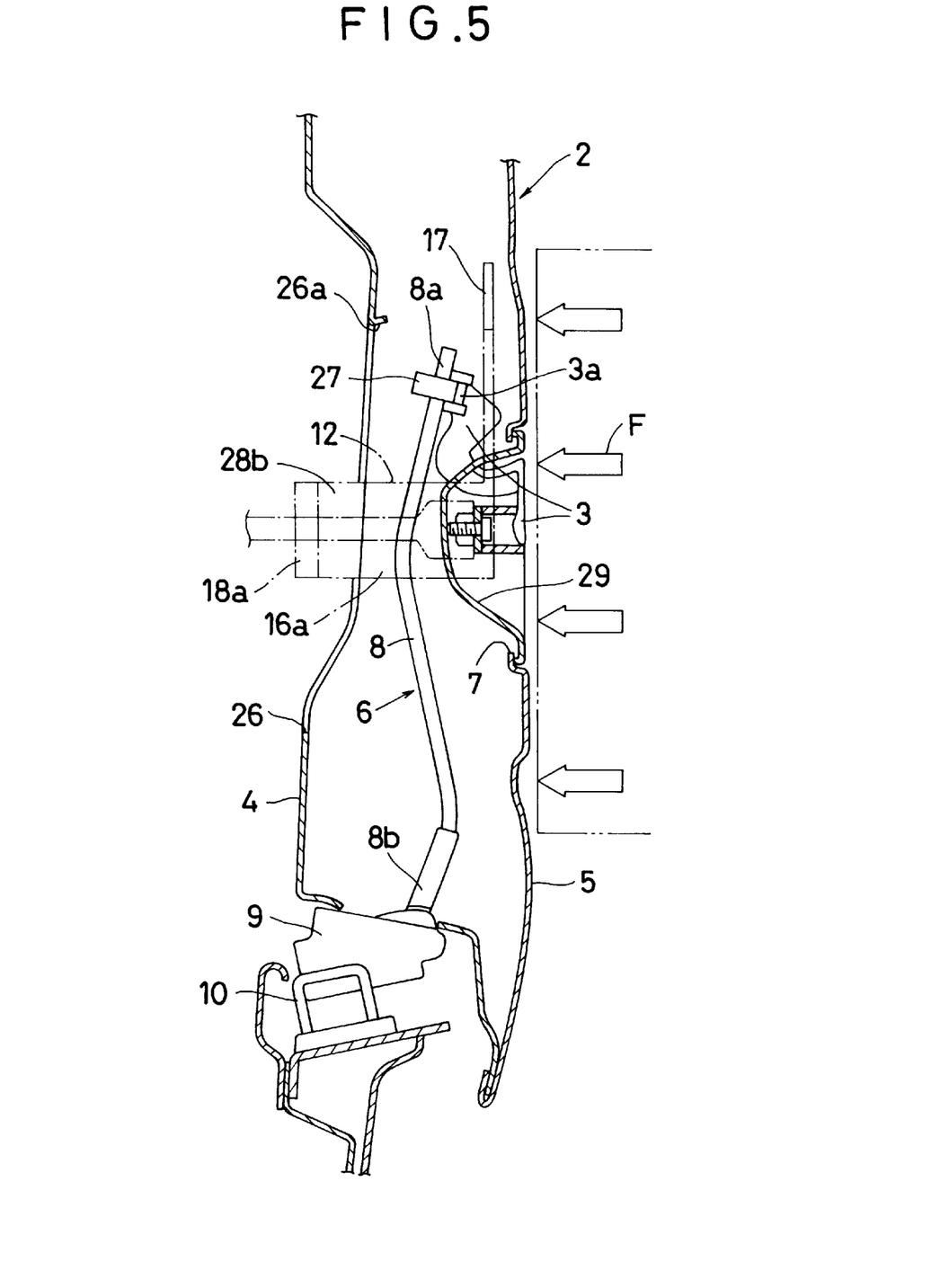
FIG. 5 is an enlarged sectional view taken along the line B—B of FIG. 1.
Figure 6:
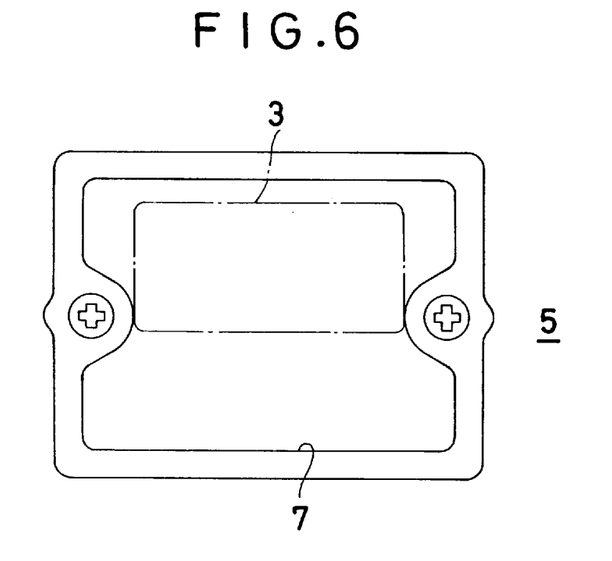
FIG. 6 is a front view of a handle operating opening portion of the door.

As shown in FIG. 5, the back door 2 is configured by joining a door inner panel 4 constituting the door inside surface and a door outer panel 5 constituting the door outside surface into a closed cross section shape, and the turning type back door opener handle 3 and an interlocking mechanism 6 connecting with the back door opener handle 3 are disposed on the back surface of the door outer panel 5. The back door opener handle 3 is arranged at the upper half portion of a handle operating opening 7 formed in the door outer panel 5 as shown in FIGS. 5 and 6. As shown in FIG. 5, the interlocking mechanism 6 includes an operating rod 8 whose upper end 8a is connected to an operating rod connecting end 3a of the back door opener handle 3, a latch 9 connected to a lower end 8b of the operating rod 8, and the like, and is so configured that the interlocking mechanism 6 is operated in accordance with the turning operation of the back door opener handle 3 so that the locking state of the latch 9 and a striker 10 on the vehicle body side is released.

Figure 2:
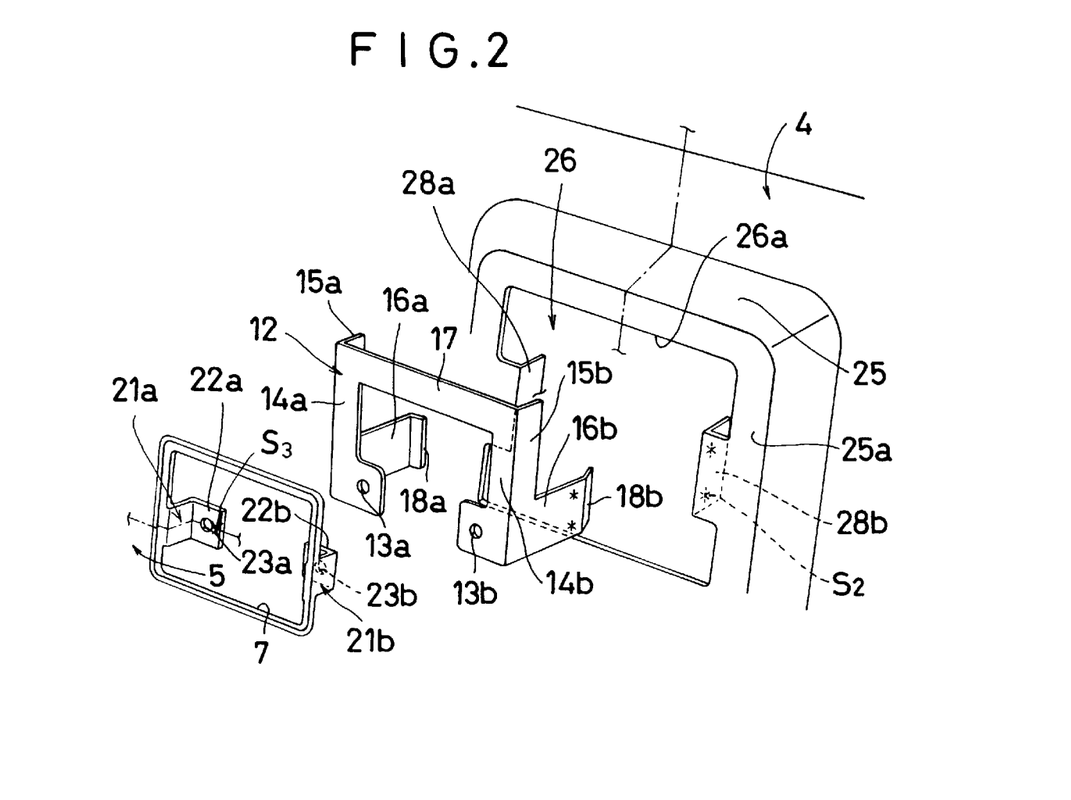
FIG. 2 is an exploded perspective view of a principal portion of a back door for the four-wheeled automobile shown in FIG. 1.
Figure 3:
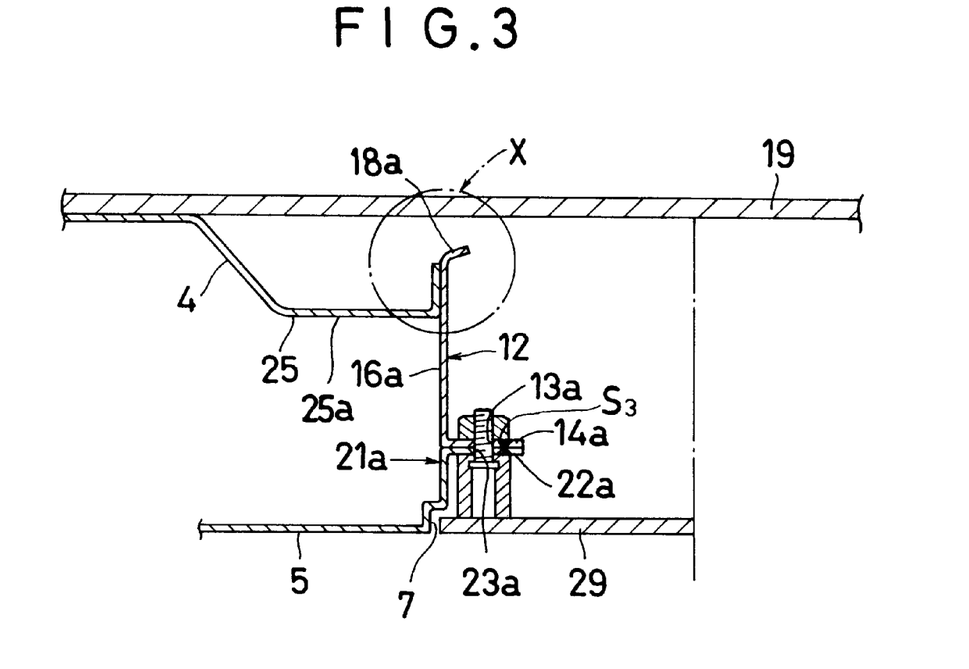
FIG. 3 is an enlarged sectional view taken along the line A—A of FIG. 1.
Figure 4:
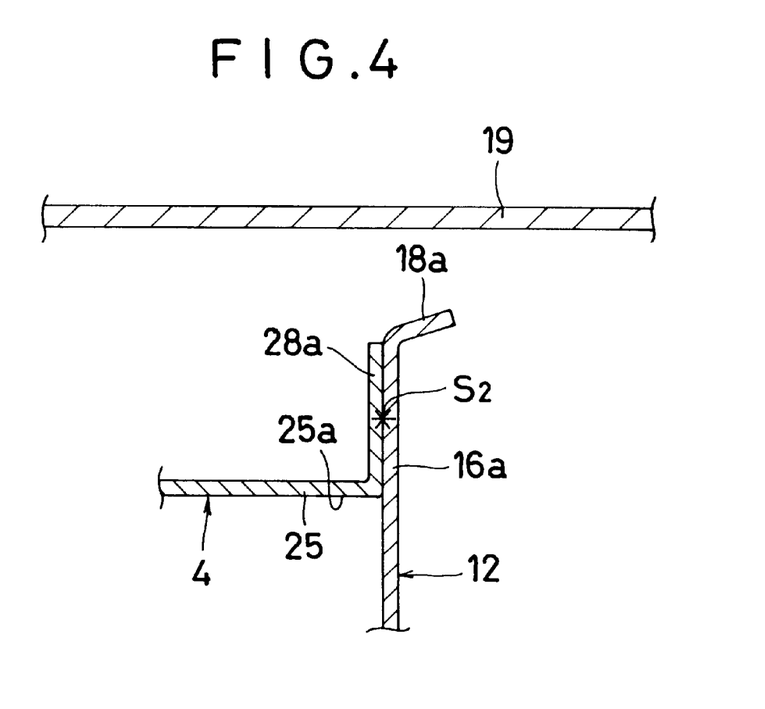
FIG. 4 is an enlarged sectional view of a portion indicated by arrow X in FIG. 3.

The following is a detailed description of a reinforcing structure at the attaching portion of the back door opener handle 3. In this embodiment, a reinforcement member 12 of a shape shown in FIGS. 2 to 4 is used. This reinforcement member 12, which is a sheet component formed in bilateral symmetry by bending, is composed of a pair of right and left vertical portions 14a and 14b extending vertically in a flat form and having bolt insertion holes 13a and 13b at the lower part, a pair of right and left facing portions 15a and 15b bent substantially at right angles to the vertical portions 14a and 14b and facing each other, a pair of right and left attaching portions 16a and 16b extending further to the rear (in assembling, the direction substantially perpendicular to the base plane of the door inner panel 4) from the lower portions of the facing portions 15a and 15b and facing each other, and a connecting portion 17 for connecting the upper parts of the paired right and left vertical portions. As clearly shown in FIGS. 2 and 4, tip end edges (rear end edges) 18a and 18b of the paired right and left attaching portions 16a and 16b are bent in the direction such that the tip end edges 18a and 18b come near to each other.

As described later, the reinforcement member 12 is first assembled to the door outer panel 5, and then assembled to the door inner panel 4. In this assembling state, the tip end edges 18a and 18b of the attaching portions 16a and 16b are arranged so that they intersect diagonally with a door inner trim 19 attached to the surface of the door inner panel 4 on the cabin side, that is, they are not perpendicular to the door inner trim 19 (see FIG. 4).

On the other hand, as shown in FIGS. 1 to 3 and FIG. 5, the door outer panel 5 is formed with a handle operating opening 7 at the lower center thereof, and a pair of L-shaped portions 21a and 21b bent toward the back surface side (toward the door inner panel 4) are provided at the right and left sides of the opening 7. Attaching portions 22a and 22b of the paired L-shaped portions 21a and 21b are arranged on the same plane in parallel to the base plane of the door outer panel 5 at a distance. Bolt insertion holes 23a and 23b are formed at predetermined places of the attaching portions 22a and 22b.

As shown in FIGS. 2 and 3, the door inner panel 4 is integrally formed with a drawn portion 25 protruding toward the back surface side (toward the door outer panel 5), and a work opening 26 corresponding to the handle operating opening 7 in the door inner panel 4 is formed in a protruding face 25a of the drawn portion 25. Further, at the right and left sides of the work opening 26 are provided bent portions 28a and 28b bent in the direction substantially at right angles to the protruding face 25a, that is, in the direction substantially perpendicular to the base plane of the door inner panel 4. The depth (length in the direction perpendicular to the base plane of the door inner panel 4) of the bent portion 28a, 28b is kept in the range of the drawing depth of the drawn portion 25.

In this embodiment, the upper half portion of the work opening 26 is also used as a service hole. An upper end 26a of the work opening 26 and the connecting portion 17 of the reinforcement member 12 (the upper part of the reinforcement member 12 corresponding to the upper part of the back door opener handle 3 and the interlocking mechanism 6) are arranged at an upper position sufficiently far apart from a connecting portion 27 (see FIG. 5), which connects the back door opener handle 3 to the upper end 8a of the operating rod 8, so as to keep out of the operating rod connecting end 3a of the back door opener handle 3 and the connecting portion 27.

The following is a description of assembling work for the door inner panel 4, the door outer panel 5, the reinforcement member 12, and the like. First, the reinforcement member 12 is assembled to the door outer panel 5 in advance. Specifically, the lower parts of the paired right and left vertical portions 14a and 14b of the reinforcement member 12 are put on the attaching portions 22a and 22b of the door outer panel 5, and these lapped portions are joined by welding with spot welds S$_3$ (see FIGS. 2 and 3), whereby the reinforcement member 12 is assembled to the door outer panel 5 in advance.

Next, the reinforcement member 12, together with the door outer panel 5, is moved toward the door inner panel 4 in the direction substantially perpendicular to the base plane of the door inner panel 4, by which the attaching portions 16a and 16b of the reinforcement member 12 are inserted in the work opening 26 of the door inner panel 4, and brought into slidable contact with the bent portions 28a and 28b of the door inner panel 4. The relative positions of the attaching portions 16a and 16b with respect to the bent portions 28a and 28b are set appropriately, and the joined portions are welded with spot welds S$_2$ (see FIGS. 2 and 4) at the appropriate positions. The door inner panel 4 and the door outer panel 5 are joined together at the edges thereof by hemming or the like.

The back door opener handle 3 is attached to a position corresponding to the upper half portion of the handle operating opening 7 on the back surface side of the door outer panel 5 so as to be capable of being turned around a hinge shaft (not shown). On the other hand, the interlocking mechanism 6 consisting of the operating rod 8 and the like is disposed on the back surface side of the door inner panel 4. A handle case 29 (see FIG. 3) is threadedly installed with bolts and nuts by using the bolt insertion holes 23a and 23b of the door outer panel 5 and the bolt insertion holes 13a and 13b of the reinforcement member 12. Then, by using the upper half portion of the work opening 26 of the door inner panel 4 as a service hole, the work for connecting the back door opener handle 3 to the upper end 8a of the operating rod 8 of the interlocking mechanism 6 is performed by inserting hands through the service hole from the outside of the door inner panel 4. Thereafter, the door inner trim 19 is installed to the surface of the door inner panel 4 (see FIG. 3), thus completing the assembly of the back door 2.

According to the structure of the back door 2 configured as described above, the spot weld faces of the reinforcement member 12 and the door inner panel 4 (the mating faces of the attaching portions 16a and 16b and the bent portions 28a and 28b) are made slidable in the direction in which the reinforcement member 12 is assembled, that is, in the direction substantially perpendicular to the base plane of the door inner panel 4. Therefore, even if variations occur in the distance between the door inner panel 4 and the door outer panel 5, the variations can be absorbed sufficiently at the mating portions of the spot weld faces. Moreover, according to the configuration of this embodiment, the direction in which the reinforcement member 12 and the door inner panel 4 are connected to each other by spot welding is a shear direction with respect to the handle operating force of the back door opener handle 3, so that the connection strength can be increased significantly. Therefore, this structure is advantageous in terms of strength.

As described above, the connecting portion 17 of the reinforcement member 12 and the upper end 26a of the work opening 26 of the door inner panel 4 are arranged above the back door opener handle 3 and the upper end 8a of the operating rod 8 connected to the operating rod connecting end 3a of the back door opener handle 3 so as to keep out of these elements. Therefore, the following advantages are offered: Even if deformation is caused on the door outer panel 5 by an excessive impact force applied to the door outer panel 5 from the rear of the back door 2 as indicated by arrows F in FIG. 5, by which the reinforcement member 12 is deformed and the back door opener handle 3 and the interlocking mechanism 6 are moved toward the door inner panel 4 in the direction of vehicle front, the connecting portion 17 of the reinforcement member 12 does not hit the operating rod connecting end 3a of the back door opener handle 3 or the upper end 8a of the operating rod 8, and the operating rod connecting end 3a and the upper end 8a do not interfere with the door inner panel 4. Therefore, the occurrence of trouble such that the back door 2 is opened unexpectedly by the malfunction of the back door opener handle 3 and the operating rod 8 can be prevented.

Also, in this embodiment, since the tip end edges 18a and 18b of the reinforcement member 12 are bent, as described above, so as to intersect diagonally with the base plane of the door inner trim 19, if the reinforcement member 12 is moved in the direction of vehicle front by an excessive impact force applied from the rear of the back door 2, the tip end edges 18a and 18b are bent at the roots thereof when they hit the door inner trim 19, so that the tip end edges 18a and 18b come into plane contact with the door inner trim 19 (plane contacting state). Therefore, the tip end edges 18a and 18b do not stick in the door inner trim 19, and the further movement of the reinforcement member 12 in the direction of vehicle front can be prevented in the plane contacting state. Moreover, the tip end edges 18a and 18b of a bent shape can be used as a guide in assembling the reinforcement member 12 to the door inner panel 4, so that the workability of assembling can be improved. In addition, the strength of the reinforcement member 12 itself and in turn the strength of the portion where the back door opener handle 3 is disposed can be improved by the presence of the tip end edges 18a and 18b of a bent shape.

Further, since there is provided the drawn portion 25 protruding in the direction such that the door inner panel 4 approaches the door outer panel 5 at the position near the connecting portion connecting with the reinforcement member 12, a space where the bent portions 28a and 28b are disposed can be secured in the door inner panel 4, and the positional accuracy of the back door opener handle 3 and the strength of the door inner panel 4 can be increased. Accordingly, the reinforcement member 12 can be smaller in size, and therefore the cost and weight of the reinforcement member 12 can be decreased.

The above is a description of one embodiment of the present invention. The present invention is not limited to the above-described embodiment, and various changes and modifications may be made on the basis of the technical concept of the present invention. For example, although the reinforcement member of a one-piece type is used in the above-described embodiment, the reinforcement member formed by a combination of several kinds of separate components can be used. Also, the present invention can be applied to a side door etc. of various types of automobiles, not limited to the back door 2 of the four-wheeled automobile 1.

As described above, according to the present invention, the door inner panel is formed by bending with bent portions substantially perpendicular to the base plane of the door inner panel, and the reinforcement member for reinforcing the portion where the door opener handle is disposed is provided with the attaching portions facing the bent portions of the door inner panel, by which the attaching portions of the reinforcement member and the bent portions of the door inner panel are joined together in the state in which they are in contact with each other. Therefore, the variations in the distance from the door opener handle tightening plane of the door outer panel to the door inner panel can be absorbed by the adjustment of relative position of the attaching portions and bent portions in the direction substantially perpendicular to the base plane of the door inner panel, so that the deformation of the door outer panel, the floating of the door opener handle, and other troubles can be prevented. Moreover, according to the door structure in accordance with the present invention, since the operating force of the door opener handle acts in the shear direction with respect to the connecting portion where the attaching portions and the bent portions are joined to each other, the connection strength is increased. Therefore, this structure is also advantageous in terms of strength.

Also, according to the present invention, the upper end of the work opening formed in the door inner panel so as to correspond to the door opener handle and the interlocking mechanism therefor and the upper portion the reinforcement member corresponding to the door opener handle and the interlocking mechanism therefor are arranged above the door opener handle and the upper end of the operating rod of the interlocking mechanism. Therefore, even if the door outer panel is deformed by an excessive impact force applied from the outside and the operating rod connecting portion is moved toward the door inner panel, the operating rod connecting portion and the work opening of the door inner panel do not interfere with each other because they are in a positional relation of having a distance vertically, so that the trouble such that the door is opened unexpectedly by the malfunction of the operating rod connecting portion of the door opener handle and the operating rod of the interlocking mechanism can be prevented.

Also, according to the present invention, the tip end edges on the cabin side of the attaching portions of the reinforcement member are bent so as to intersect diagonally with the base plane of the door inner trim disposed on the inside surface of the automotive door. Therefore, even if the door outer panel is deformed by an excessive impact force applied from the outside and the reinforcement member is moved toward the door inner panel, the tip end edges of the reinforcement member do not stick in the door inner trim, being deformed by bending, and engage with the door inner trim in a plane contacting state. As a result, the luggage in the cabin is prevented from being damaged by the reinforcement member. In addition, the tip end edges can be used as a guide in assembling the door outer panel to the door inner panel, and the strength of the attaching portion of the reinforcement member can be increased.

Also, according to the present invention, the drawn portion such that the door inner panel approaches the door outer panel is formed in the door inner panel at a position near the connecting portions of the attaching portions of the reinforcement member and the bent portions of the door inner panel. Therefore, the strength of the door inner panel and the positional accuracy of the door opener handle can be increased by the presence of the drawn portion, and in turn the size and weight of the reinforcement member can be decreased, resulting in a decrease in cost of the reinforcement member.

While particular embodiments of the invention have been described, it will be understood, of course, the invention is not limited thereto since modifications may be made by those skilled in the art, particularly in light of the foregoing teachings. It is therefore, contemplated by the appended claims to cover any such modifications that incorporate those features of these improvements in the true spirit and scope of the invention.

What is claimed is:

1. An automotive door structure having a door inner panel, a door outer panel, a reinforcement member, and a door opener handle mounted to said outer panel wherein said inner panel includes at least a pair of attaching portions which extend substantially perpendicular to a plane extending parallel to said inner panel, said inner panel attaching portions each including an inner panel bent portion which extends at an angle relative to the respective inner panel attaching portion, said reinforcement member being positioned between said inner and outer panels and including at least a pair of reinforcement attaching portions which each include a tip end which is bent at an angle relative to the respective reinforcement attaching portion wherein said reinforcement attaching portion and said inner panel bent portions are joined together.

2. An automotive door structure according to claim 1 wherein said door inner panel defines a work opening having an upper end and a lower end which is positioned adjacent said door opener handle, said door opener handle is mounted to the outer panel and cooperates with an interlocking mechanism having an opening rod, and said reinforcement member includes a connecting portion at its upper end thereof wherein said work opening upper end and said connecting portion are positioned above the door opener handle and the operating rod associated therewith.

3. An automotive door structure according to claim 1 wherein said bent tip ends of said reinforcement member extend along a plane which intersects diagonally with respect to said panel plane.

4. An automotive door structure according to claim 1 wherein said door inner panel includes a drawn portion extending outwardly towards said door outer panel, said drawn portion defining a work opening and supporting said attaching portions of said inner panel wherein said bent tip ends of said reinforcing member extend through said work opening.

* * * * *